Dec. 2, 1930.  P. E. WELTON ET AL  1,783,759
FUEL BRIQUETTE
Filed Nov. 25, 1922

Patented Dec. 2, 1930

1,783,759

UNITED STATES PATENT OFFICE

PARK E. WELTON AND GEORGE H. WADSWORTH, OF AKRON, OHIO, ASSIGNORS TO THE P. E. WELTON ENGINEERING COMPANY, OF AKRON, OHIO, A CORPORATION OF OHIO

FUEL BRIQUETTE

Application filed November 25, 1922. Serial No. 603,169.

The object of this invention is to provide fuel elements such as are commonly called briquettes and which we choose to call "coaletts" and which may be cheaply manufactured, easily handled, be highly combustible and have other advantageous characteristics such as easy ignition, slow and efficient burning qualities, and leave a minimum amount of ash.

Other objects include the making of such a briquette of easily obtainable and cheap material. The process by which we manufacture fuel elements of this character is described in our application filed on an even date herewith, entitled "Process of briquetting fuel". The combination of the materials and the physical character of the briquette forming the basis of this application are herein illustrated and further described in the following specification. The essential characteristics are summarized in the claims.

Figure 1:
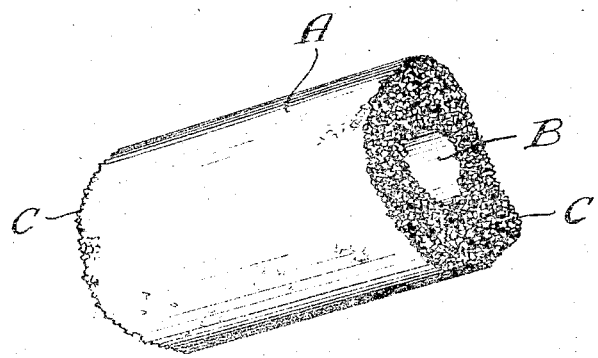
Figure 2:
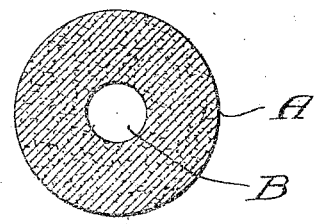

In the drawings, Fig. 1 is a perspective view of one of our briquettes. Fig. 2 is a cross section of the same.

The briquette shown consists of a substantially cylindrical body A preferably provided with a longitudinal opening therethrough indicated at B, thus providing in effect a hollow briquette.

One of the objects of the invention is to so shape the briquette that the gas generated under combustion is allowed to be burned around the outside, while that formed and given off on the inside is permitted to escape through the opening therethrough, thus burning at each end and intensifying the heat given off. This assures the complete combustion of the briquette.

To cause the briquette to start burning, that is, to ignite readily, the ends thereof are provided with numerous fine projections as indicated at C. The briquettes may be formed on a core making or similar extruding machine, as the material of which they are made is granular. These projections result from breaking the briquettes into approximate lengths rather than cutting them as would be the natural thing to do. The material of which we prefer to make these fuel elements is as follows:

We use coal culm, which consists of coal of the consistency or fineness of dust to particles capable of passing through 16 to 8 mesh screen. Using 100 parts of this, we may add about one-half part water and three parts petroleum residue such as granulated paraffine, and about two parts of sulfite liquor such, for example, as paper pulp by-product sulfite, which comprises calcium, sulfite, sodium, carbonate and organic matter in the form of cellulose. We also use water to make the whole a putty-like consistency which may be extruded in the form of a thick walled tube or cylinder with a hollow core which is then broken, as shown in the drawings. When such a mixture is tubularly formed by the use of the extruding machine referred to, the inner and outer cylindrical surfaces of the briquettes are quite compact relative to the remainder of the granular structure of the briquette wall. They are then subjected to heat in an oven sufficient to drive off the water and at the same time dry the sulfite liquor which in combination with the petroleum residue acts as a binder for the dried briquettes. We recommend the use of a petroleum residue wax which may be placed in the briquette composition in solid particle form and which will have a melting point which is above an accelerated drying temperature or evaporating temperature for the moisture introduced into the mixture in the form of sulphite liquor. Hence after the briquettes are dried, the temperature thereof may be raised to melt the petroleum wax and thereby coat or cerate the dried sulphite binder.

As a substitute for sulfite and in similar quantities, we may use lignone, it being only necessary to get some substance of this character which is capable of acting as a binder for the dried briquettes, preventing the powdering or crushing of the briquettes until they have been completely burned.

By reason of the hard skin formed on the briquette, the moisture is driven from the briquette when being dried longitudinally thereof. This action of the steam increases the porosity of the briquette wall in a direction extending longitudinally of the briquette.

Having thus described our invention, we claim:—

1. A briquette formed into a hollow body consisting of substantially one hundred parts coal culm, three parts petroleum residue, one-half part water, and a binder such as sulphite by-product lignone.

2. A briquette formed into a hollow body, consisting of substantially one hundred parts coal culm, three parts granulated or shredded oil refinery residue wax, one-half part water, two parts of a binder such as paper pulp by-product sulphite or lignone.

3. A hollow cylindrical briquette formed to have a percentage of void in its wall structure affording a longitudinal porosity extending from end to end of the briquette.

PARK E. WELTON.
GEORGE H. WADSWORTH.